May 17, 1932. H. D. TAYLOR 1,858,473
CAR TRUCK
Original Filed June 8, 1928 2 Sheets-Sheet 2
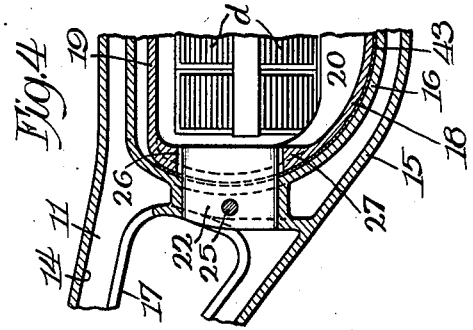
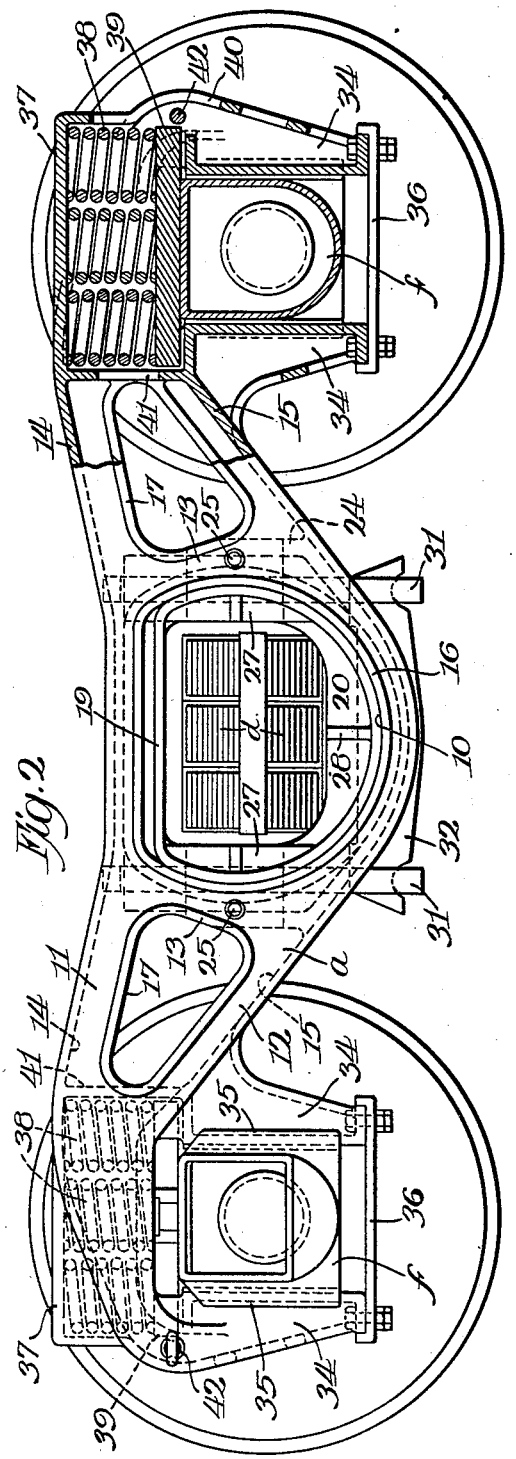
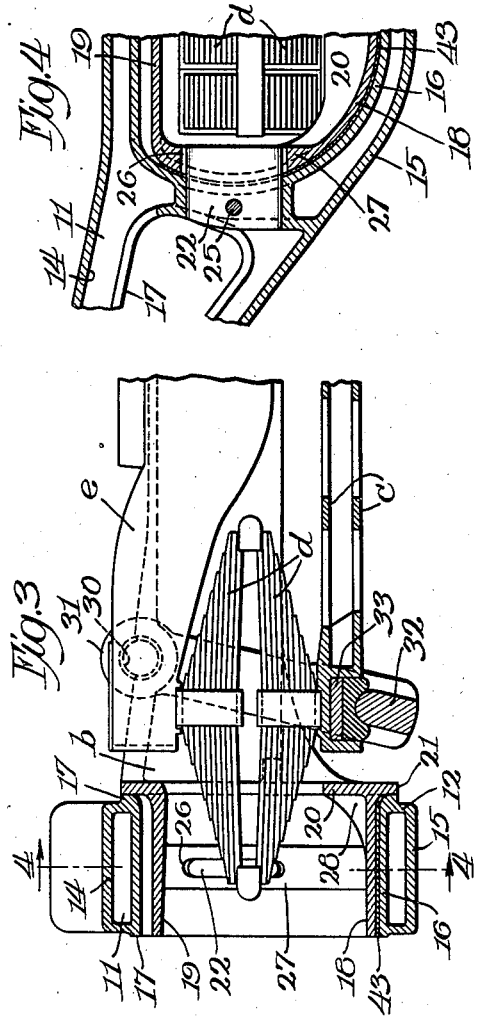
Inventor:
Howard D. Taylor
By Fisher, Clapp, Soans & Pond. Attys.

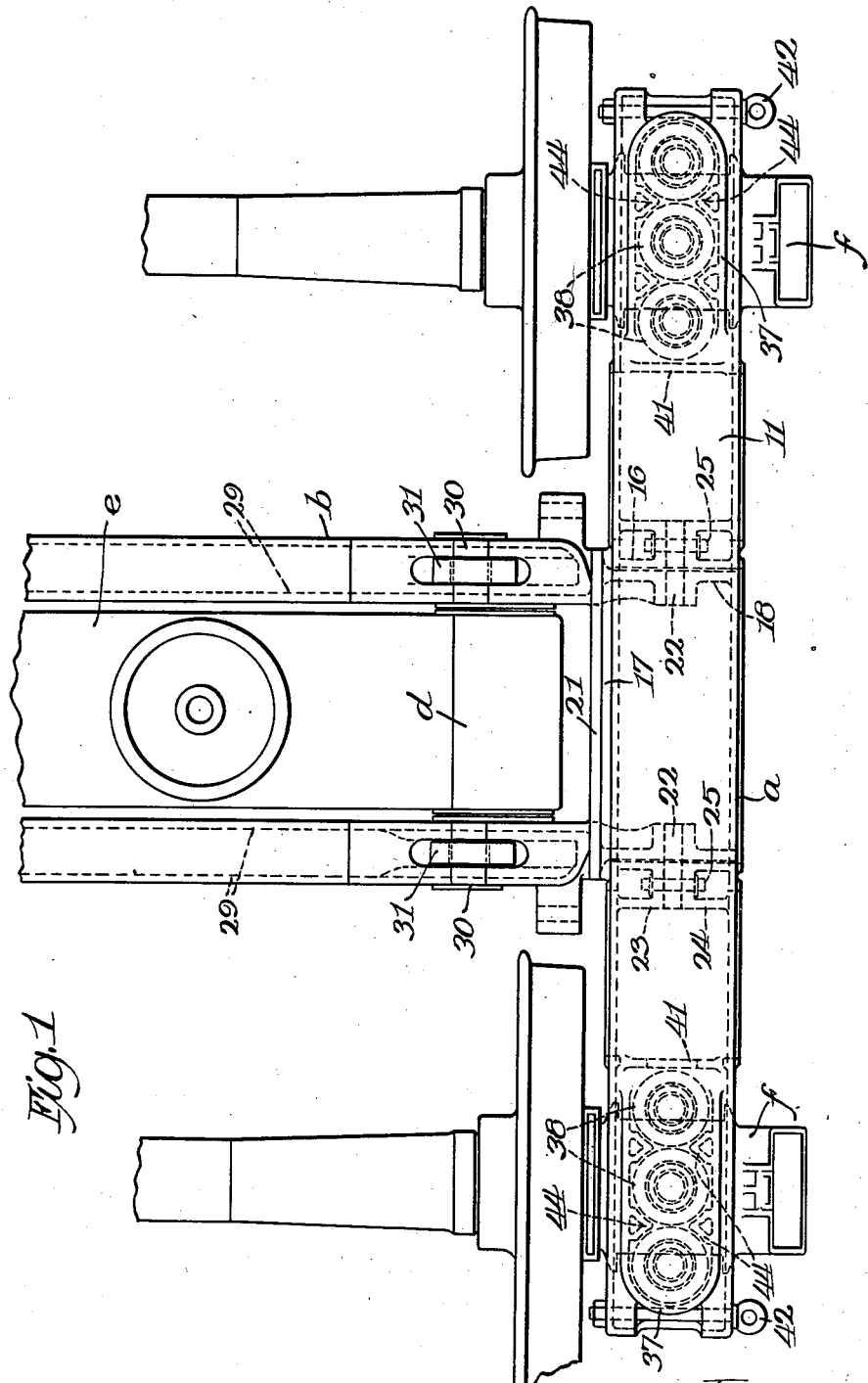

Patented May 17, 1932

1,858,473

UNITED STATES PATENT OFFICE

HOWARD D. TAYLOR, OF NEW YORK, N. Y., ASSIGNOR TO FLEXIBLE TRUCK CORPORATION, OF PHILADELPHIA, PENNSYLVANIA, A CORPORATION OF DELAWARE

CAR TRUCK

Application filed June 8, 1928, Serial No. 283,805. Renewed March 24, 1930.

The invention relates to car trucks in which the means for supporting the truck bolster and bolster springs is journaled in enlarged bearing openings in the central portions of the truck side frames, to permit the relative rocking movement of the side frames in passing over irregularities of the track. In order to facilitate the independent rocking movement of the side frames, provide a stout construction and make ample provision for a large, heavy bolster, bolster supporting means and springs as required by modern practice, it is desirable that the central bearing openings of the side frames and the parts or members journaled therein shall be as large as possible. But the height of the central portions of the side frame is necessarily limited by the standard regulations with respect of the height of the truck center and the required track clearance.

In accordance with the present invention, enlargement of the bearing openings in the side frames and of the parts journaled therein is effected without unduly increasing the height of the central portion of the truck, by flattening or truncating the upper part of the central bearing portions of the side frames and of the parts or members journaled therein, and by spacing the upper flattened or truncated portions of the journals from the corresponding portions of the bearing openings so as to permit the limited rocking movement of the side frames.

The present invention relates more particularly to trucks for tenders and passenger cars and provides an improved construction in which the side frames are connected by a truck transom having integral journals at its ends which are mounted within the bearing openings of the side frames, the transom being chambered and provided with means for receiving and supporting the truck bolster and bolster springs. Also, in the preferred form shown, the side frames are supported at their ends upon springs carried by the journal boxes, the side frames having pedestal yokes engaging the journal boxes and having spring-receiving pockets at their upper portions. This construction obviates the use of equalizing bars, and to strengthen it the upper members of the side frames preferably extend upwardly from the central portion thereof.

The foregoing and other features of the invention is hereinafter more fully set forth in detail, is illustrated in its preferred form in the accompanying drawings and is particularly defined in the appended claims.

In the drawings:

Fig. 1 is a partial plan view of the improved truck.

Fig. 2 is a side elevation with parts shown in longitudinal section.

Fig. 3 is a partial transverse central section.

Fig. 4 is a longitudinal section of the central portion of the truck side frame and of the end of the transom journaled therein.

The truck side frames $a$ are each provided with an enlarged central bearing opening 10 which is cylindrical throughout the greater portion of its periphery, but is flattened or truncated at its upper portion, as most clearly shown in Figs. 2 and 4, and the central portion of the side frame is of corresponding outline. The side frame is preferably formed of cast steel and comprises, as usual, upper and lower of compression and tension members 11 and 12 integrally connected at their ends and connected on opposite sides of the central bearing opening by struts 13. The parts of the side frames comprise inner and outer side walls connected by transverse webs 14 and 15 extending respectively along the upper edge of the compression member and along the lower edge of the tension member, and by a transverse web 16 extending about and forming the wall of the bearing opening 10. Thus, the portions of the lower member 12 between the center and ends of the side frame are U-shaped in section and the corresponding portions of the upper side frame member 11 are of inverted U-shape in section. But the flattened central portion of the upper member and the rounded central portion of the lower member which are of contracted height to provide a large bearing opening, are of closed box section, as most clearly shown in Fig. 3. Preferably, as shown, the edges of the bearing opening 10 and of the triangular openings between the center and ends of the side frame are provided with stiffening beads 17.

This arrangement provides a strong construction for the central portions of the side frames of the truck and at the same time provides bearing openings for receiving large, stout journal members that are well adapted to sustain the loads imposed on the truck, and also aid in forming a secure connection between the side frames and the other parts of the truck.

In the preferred form shown, the journal members 18 are integrally formed upon the ends of a transverse truck transom $b$. This transom is chambered to receive the truck bolster and bolster-supporting springs and the journals 18 are also hollowed or chambered and the upper portion of each journal is flattened or truncated and is formed by a substantially horizontal member 19 extending between the sides of the journal. As shown in Figs. 2 and 4, the truncated portions of the journal and bearing are spaced from one another and in the form shown the journal is of less height than the bearing opening, so that the truck side frames may rock in vertical planes to a limited extent without disturbing the journals and parts carried thereby.

The truck transom is provided at the inner end of each journal with a transverse web 20 which extends inwardly from the sides and bottom portion of the journal to stiffen the same, and also projects outwardly beyond the walls of the journal to form a shoulder 21 which abuts against the bead 17 at the inner end of the journal opening in the side frame. Keys 22 arranged on opposite sides of each journal and bearing opening detachably interlock the side frames and truck transom. These keys are fixed within the pockets formed by walls 23 which extend between the sides of the web 16 and webs 24 that extend transversely between the inner and outer side walls of each side frame at the outer edges of the struts 13. Bolts 25 removably secure the keys in position and the inner ends of the keys fit within slots 26 formed in the opposite side walls of the journal member and the portions of the journal having these slots are stiffened or strengthened by vertical ribs 27. As shown, the length of the slots 26 is greater than the width of the keys, to permit the limited rocking movement of the side frames. These ribs and also the inner portions of the web 20 are preferably provided with stiffening gussets 28.

The main body of the truck transom between the webs 20 and the shoulders 21 comprise spaced double side walls 29. The integral webs 20 and journals 18 form end sections that connect the spaced side walls of the transom and provide means for detachably connecting the transom to the side frames as described. At their ends the transom side walls 29 are provided with seats for pivot pins 30 which support the hangers or links 31. The hanger links depend between the sections of the double or hollow side walls 29 and bars 32 extending through openings in the lower ends of the links are provided with rounded upper edges which are engaged by shoes 33. The latter are seated in pockets in the ends of a transverse spring plank $c$. Heavy elliptical springs $d$ mounted on the ends of the spring plank extend transversely of the truck with their outer ends projecting into the hollow journal members. The truck bolster $e$ is arranged between the side walls 29 of the transom and is supported at its ends upon the springs $d$.

If desired, the journal boxes can be rigidly fixed to or cast integral with the side frame. But in the preferred form shown the side frames are supported on springs which are carried by the journal boxes and the latter are mounted in pedestal yokes 34 formed upon the ends of the side frames. The legs of the yokes are U-shape in section being formed of side walls and transverse webs and the journal boxes, as usual, are provided with guide lugs 35 which overlap the side edges of the yokes. As usual, the lower open ends of the legs of the pedestal yokes are connected by straps 36.

Above the yokes the side frames are provided with integral spring pockets 37 which are preferably elongated as shown and each is arranged to receive a series of three springs 38 arranged in a row extending longitudinally of the side frame and supported upon a plate 39 which is seated upon the top of the corresponding journal box. The springs and plate can be inserted through an opening 40 in the upper outer end portion of the side frame and the plate is held in position by a transverse stiffening web 41 and a removable bolt 42 which passes between the side flanges of the outer leg of the pedestal yoke. Preferably, the inner walls of the spring pockets are provided with lugs 44 (see Fig. 1) for maintaining the springs in spaced relation. To stiffen and strengthen the pedestal yokes and spring pockets, the upper member 11 of the side frame is inclined upwardly from the flattened or truncated central portion thereof.

In the improved construction ample provision is made for the use of springs and other parts required for trucks adapted to carry heavy loads. At the same time the height of the central portion of the truck is not excessive, ample provision is made for proper track clearance, and the side frames are free to rock to a considerable extent, independently of the truck transom and bolster, so that the parts of the truck and the cars supported thereby are not subjected to severe strains in passing over irregularities of the track. Preferably a liner 43 of hard, nonferrous metal, and preferably of spring brass, is interposed between the side frame bearings and the journal members 18.

Changes may be made in the details set forth without departure from the scope of the appended claims.

I claim as my invention:

1. In a car truck, side frames having enlarged central bearing openings, means chambered to receive and support the truck bolster and bolster springs and comprising journals mounted in the bearing openings of the side frames, the bearing openings and the journals having truncated upper portions shaped to permit the limited relative rocking movement of the side frames, substantially as described.

2. In a car truck, side frames having central portions provided with enlarged cylindrical bearing openings truncated at their upper portions, transverse connecting means between the side frames including members journaled in said bearing openings and also truncated at their upper portions and shaped to permit the limited relative rocking movement of the side frames, substantially as described.

3. A car truck comprising side frames having enlarged central bearings, bolster supporting means journaled in said bearings and interlocked therewith, the bearing and journals having truncated upper portions shaped to permit the limited rocking movement of the side frames relative to the bolster supporting means, substantially as described.

4. A car truck comprising side frames having central portions forming enlarged cylindrical bearings provided with truncated or flattened upper portions, members correspondingly truncated, but of less height, journaled in the bearings, bolster and bolster-springs supported by the side frames through the medium of said journal members, and keys secured to the side frames on opposite sides of the bearing openings and engaging slots in the journal members, the construction permitting the limited relative rocking movement of the side frames, substantially as described.

5. A car truck comprising side frames provided with central portions forming enlarged cylindrical bearings having truncated upper portions, a transom chambered to receive the bolster and bolster-springs and having end portions journaled in the side frame bearings and also truncated at their upper portions in a manner permitting the limited relative rocking movement of the side frames, substantially as described.

6. A car truck comprising side frames having pedestal yokes at their ends for receiving the journal boxes and superposed springs, and having central portions forming bearing openings cylindrical throughout the greater portion of their periphery and provided with truncated or flattened upper portions, a transom chambered to receive the truck bolster and bolster-springs and having ends journaled in the side frame bearings and correspondingly shaped but of less height, and keys detachably interlocking the side frames and transom in a manner permitting the limited relative rocking movement of the side frames, substantially as described.

7. A cast metal car truck side frame having a central portion forming a continuous walled bearing opening cylindrical throughout the greater portion of its periphery and truncated or flattened at its upper portion, substantially as described.

8. A cast metal side frame for car trucks having central portions of hollow box section forming an enlarged bearing opening truncated at its upper portion, substantially as described.

9. A cast metal side frame having integral pedestal yokes at its ends with spring receiving pockets at the upper ends of the yokes and also having central portions forming a cylindrical bearing truncated at its upper portion.

10. A cast metal side frame having integral pedestal yokes at its ends with spring receiving pockets at the upper ends of the yokes and also having central portions forming a continuous walled bearing opening cylindrical throughout the greater portion of its periphery and having a truncated or flattened upper portion, and the upper and lower members of the side frame being inclined upwardly from the central portion, substantially as described.

11. A truck transom chambered between its ends to receive the bolster and bolster-springs and having hollow end journals provided with truncated upper portions, substantially as described.

12. A cast metal truck transom having integral hollow end journals cylindrical through the greater portions of their peripheries and having truncated upper portions, and the transom being chambered between its end journals to receive spring plank supporting links, bolster-springs and bolster, substantially as described.

13. A cast metal truck transom having double side walls spaced apart to receive the bolster and bolster springs and the sections of each wall being spaced to receive spring plank supporting links, and said transom having hollow end journals truncated at their upper portions and shoulders at the inner ends of the journals, substantially as described.

14. A cast metal car truck side frame having a central portion of box section forming a bearing having a cylindrical lower portion and a truncated or flattened upper portion, and upper and lower members of U-section extending from the center to the ends of the side frame, substantially as described.

15. A car truck comprising side frames having pedestal yokes and spring pockets at their ends for receiving the journal boxes and supporting springs carried thereby respectively, and said side frames having central portions having bearing openings, a truck transom chambered to receive the truck bolster and bolster supporting springs and having end portions journaled in the side frame bearings, and means interlocking the side frames and transom in a manner permitting the limited, relative rocking movement of the side frames, substantially as described.

16. In a car truck, a truck transom having spaced side walls and hollow end journals, side frames mounted on and connected to the end journals of the transom for a limited, independent rocking movement, a truck bolster disposed between the side walls of the transom, a spring plank, hanger links therefor supported by the transom, and elliptical springs interposed between the ends of the bolster and spring plank and extending within said hollow end journals, substantially as described.

17. In a car truck, a truck transom, side frames centrally journaled on the ends of said transom and connected thereto for limited, independent rocking movement, said side frames having pedestal yokes and spring pockets at their ends, journal boxes guided in said yokes, supporting springs disposed in said spring pockets and carried by said journal boxes, said transom comprising spaced side walls, a bolster and bolster springs disposed between the spaced side walls of the transom, a spring plank and spring plank hangers supported by the transom, substantially as described.

HOWARD D. TAYLOR.